United States Patent [19]

Mills

[11] Patent Number: 4,549,611

[45] Date of Patent: Oct. 29, 1985

[54] MULTI-PURPOSE HAND TOOL

[76] Inventor: Robert C. Mills, 249 Cedar Dr., West Milton, Ohio 45383

[21] Appl. No.: 628,402

[22] Filed: Jul. 6, 1984

[51] Int. Cl.$^4$ .......................... E04D 13/06; A01B 1/20
[52] U.S. Cl. .................................. 172/375; 15/236 R; D8/7; 111/99
[58] Field of Search .................. 172/375, 380, 13, 371; 15/236 R; 111/99, 89, 92, 4; D8/7, 8, 9, 10, 11

[56] References Cited

U.S. PATENT DOCUMENTS

| | | | |
|---|---|---|---|
| 933,304 | 9/1909 | Hughes | 172/375 |
| 1,750,845 | 3/1930 | Lach | 15/236 R |
| 3,116,796 | 1/1964 | Miljan | 172/375 X |
| 3,592,272 | 7/1971 | Perez | 172/375 |
| 3,626,542 | 12/1971 | Despain | 15/236 R |
| 3,858,267 | 1/1975 | Swannie | 15/236 R |
| 4,194,780 | 3/1980 | Dilley | 15/236 R |

FOREIGN PATENT DOCUMENTS

| | | | |
|---|---|---|---|
| 195903 | 5/1890 | France | 111/99 |
| 1559925 | 1/1980 | United Kingdom | 15/236 R |

Primary Examiner—Richard J. Johnson
Attorney, Agent, or Firm—Becker & Becker, Inc.

[57] ABSTRACT

A tool including a handle secured axially to a reversible face plate structure having a flat sheet metal body including a first portion with a half-round-curved edge or periphery adapted to fit into half-round gutters as well as a second portion with a more rectangular peripheral contour conforming or complementary to inner shape of so-called "K" type gutters. A free end of the handle has a truncated, tapered end portion. Additional light-duty uses or applications total at least twelve tasks for employment thereof including use of the tool as a weeder in a garden; a ditcher; a hoe; a spreader; a row-forming tool; a seed-bed tool; a furrowing tool; a deep planting tool for bulbs, sets and small plants; a blending tool for mortar or plaster; a hand tiller for mulch and dry chemicals or fertilizer; a hand tamping tool for soil or sand; a planting lateral-spacing-gauge tool; a planting depth-gauge tool; and as a scraper for dirt, mud, plaster, mortar and the like. The handle has gauge markings located intermediate thereon.

10 Claims, 2 Drawing Figures

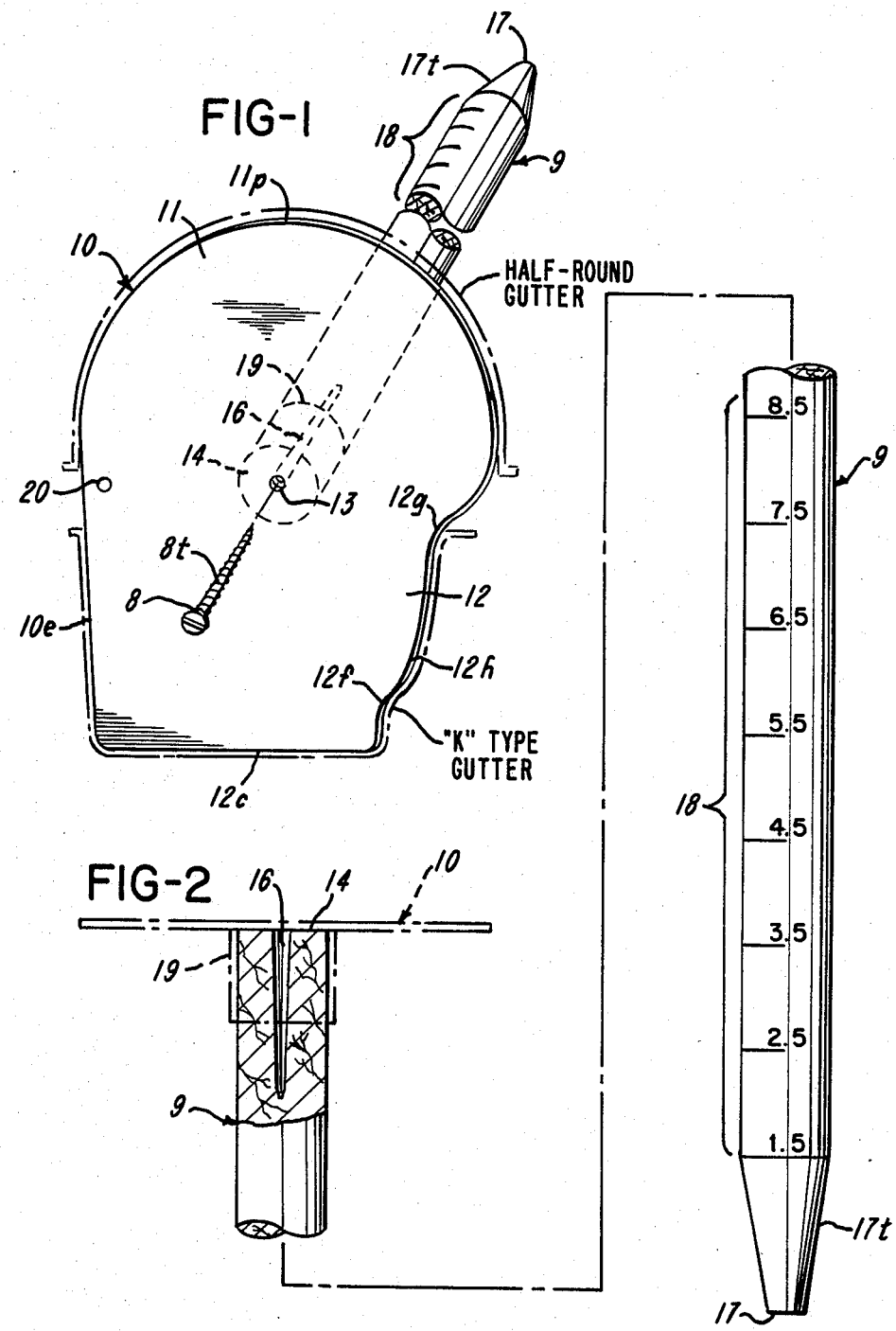

MULTI-PURPOSE HAND TOOL

The present invention relates to a tool capable of being employed for performing at least a dozen or more tasks via a unique combination of features concentrated in a minimum number of parts

BACKGROUND OF THE INVENTION

1. Field of the Invention At least a dozen uses or applications exist to meet needs and perform tasks around a home and garden including combination features of the tool being used basically in the following scopes of endeavor:

(A) As a gutter or spouting clean-out tool usable for the following:
   (a) narrow "K" type gutters;
   (b) wide "K" type gutters;
   (c) narrow half-round gutters; and
   (d) wide half-round gutters as well as also including most other common types of gutter or spouting cross-section configurations;

(B) Additional light-duty uses or applications include the combination features of the tool being used for the following:
   (e) as a weeder in a garden;
   (f) as a ditcher;
   (g) as a hoe;
   (h) as a spreader;
   (i) as a row-forming tool;
   (j) as a seed-bed tool;
   (k) as a furrowing tool;
   (l) as a deep-planting tool for bulbs, sets (onion, for example), and small plants;
   (m) as a blending tool for mortar;
   (n) as a hand tiller for mulch and dry chemicals;
   (o) as a hand tamping tool for soil or sand;
   (p) as a planting lateral-spacing-gauge tool;
   (q) as a planting depth-gauge tool; and
   (r) as a scraper.

2. Description of the Prior Art

The closest prior art would seem to be a small or miniature garden hoe having a wooden handle and a face plate possibly including a three- or four-prong portion integral therewith as commercially available in hardware stores and/or garden centers.

The following five patents relate to gutter-cleaning tools generally:

(1) U.S. Pat. No. 3,626,542-Dispain dated Dec. 14, 1971 discloses a gutter-cleaning tool having configurations for both the regular type of gutter and the half-round type of gutter configurations as shown by FIG. 2 thereof for a box-type or square gutter with flat bottom and by FIG. 3 thereof for a half-round gutter.

(2) U.S. Pat. No. 3,858,267-Swannie dated Jan. 7, 1975 discloses a gutter-cleaning tool including a flat blade which is contoured to fit the profile of the gutter (box-type or square gutters) and which is adjustable to various angles.

(3) U.S. Pat. No. 4,194,780-Dilley dated Mar. 25, 1980 discloses a gutter-cleaning tool including a handle having axially telescopic pole parts in an intermediate location between opposite double-arm paddle structure along with paddles having different vertical height to facilitate manipulation as to gutter cross-struts.

(4) U.S. Pat. No. 4,298,224-Hansen et al dated Nov. 3, 1981 discloses an implement for cleaning leaves and other debris from overhead gutters or eaves using a handle to position a bracket at a 45° angle holding a one-piece tool having a U-center-section and opposing legs having lower free ends from which cleaning blades extend each having a free scooping end to dig into compacted leaves and debris to force the same onto the blades.

(5) U.S. Pat. No. 4,310,940-Moore dated Jan. 19, 1982 discloses an apparatus to clean an overhead gutter using a stationary first fork and a rotatable second fork as well as a pusher blade operable by a control rod and crank shaft using gutter engageable rollers.

The following patents are of general interest to show multi-purpose tools:

(6) U.S. Pat. No. 3,116,796-Miljan dated Jan. 7, 1964 discloses a multi-purpose agricultural hand tool including a hammer head, sharp knife edges and cultivating hoe with flute structure as a stiffening means for a blade.

(7) U.S. Pat. No. 630,924-Pickens dated Aug. 15, 1899 discloses a trowel for a bricklayer or mason and having a measuring scale on the handle thereof in a manner representative of an early multi-purpose hand tool.

(8) U.S. Pat. No. 1,029,767-Remington dated June 18, 1912 discloses a combination tool including a shoe horn, tape measure, shoe button-hook end and foot-size measure.

(9) U.S. Pat. No. 215,077-Stone dated May 6, 1879 discloses a multi-purpose gardening tool having various configurations thereon including rake-teeth, ordinary hoe and notch to pull weeds.

(10) U.S. Pat. No. 4,122,570-Otken dated Oct. 31, 1978 shows a multi-purpose tool convertible into a rake, shovel, broom, fork, squeegee attachment, etc. as shown in FIGS. 1–10 thereof.

SUMMARY OF THE INVENTION

An object of the present invention is to provide a multi-purpose hand tool basically adapted for gutter or spouting clean-out work combined with at least a dozen or more additional tasks enumerated by the foregoing listing thereof that can be performed therewith via a combination of features including a handle secured to a single face plate having half-round-curved and "K" type configurations integral therewith at opposite edge or peripheral locations and having a substantially centrally located hole through which a fastening member such as a wood screw or serrated nail can be driven securely into an axial end of the handle, conically tapered and truncated at an opposite free end of the handle having external depth or length gauge markings longitudinally along a side of an intermediate portion of the handle between the axial end and tapered-truncated end thereof.

This object and other objects and advantages of the present invention, will appear more clearly from the following specification in connection with the accompanying drawings.

BRIEF DESCRIPTION OF THE DRAWINGS

FIG. 1 is an exploded perspective view of a multi-purpose hand tool including a face plate, handle and fastener representing only three parts having combination features in accordance with the present invention; and FIG. 2 is a fragmented elevational view of the handle as shown in FIG. 1.

DETAILED DESCRIPTION

Referring now to the drawings in detail, the multi-purpose hand tool includes only three parts, namely: a fastener 8 such as a serrated nail or wood screw, a handle 9 and a metal face plate 10 as shown in FIG. 1. The face plate 10 has a flat sheet metal body including a first portion 11 with a half-round-curved edge or periphery 11p in a configuration adapted to fit into half-round gutters as well as a second portion 12 with a more rectangular peripheral contour 12c conforming or complementary to the inner shape of so-called narrow or wide "K" type gutters known to be installed along outer locations of a roof edge laterally upwardly from roofing soffits, for example.

A hole 13 is located substantially centrally in the face plate 10 to receive a fastener 8 such as a wood screw with a tapered external thread 8t to hold the face plate 10 at an axial end 14 of a wooden dowel or handle 9 with a pre-tapped or drilled hole 16 that receives the wood-screw fastener 8 therein. The wood handle 9 is to have a total length in a range of between twelve and twenty-four inches, preferably having a total of eighteen inches with a diameter in a range between five-eighths inch and one inch, preferably a diameter of seven-eighths inch.

A free end 17 of the wood handle 9 includes a truncated, tapered portion 17t which is adapted to plug a hole into a soilbed as a deep-planting tool for differing sizes of bulbs (tulip, gladiola, crocus, and the like), sets (potatoes or onions, for example) and roots of small plants (tomato, pepper, petunia, marigold, for example).

A central portion 18 of the handle 9 located intermediate the axial end 14 and tapered portion 17t of the free end 17, has gauge markings collectively identified by a bracket adjoining reference numeral 18. These gauge markings are useful for depth of planting measurement as well as lateral spacing between planting locations, distance between rows or furrows and the like. The gauge markings as well as other measurements in inches can also be metric or a combination of inch and metric designations.

The face plate 10 in a single, unitary and integral structure as a steel sheet metal stamping is adaptable by being turned only by 180° for use in cleaning "K" type retangular gutter configurations and/or half-round curved type gutter configurations. Also the face plate 10 is adaptable as a ditcher as well as a hoe and a row-forming tool held to be pushed or pulled via the handle 9. The tool can be held by the face plate 10 so that the conically-tapered free end 17 can be used to form a downwardly tapered trough in soil for planting purposes and/or as a furrowing means in soil. The truncated-tapered end 17 also can serve as a seed bed tool. The face plate 10 can be employed as a spreader for fertilizer or seed disseminated from flat surfacing on either side thereof. The periphery 11p or edge contour 12c can be used as a hoe and/or a weeder in a garden. The face plate 10 is also employable as a blending tool for mortar by bricklayers and masons as well as by plasterers in the construction industry; also the face plate 10 is employable as a scraper in the garden to scrape away mud or dirt as well as to scrape away excess plaster or mortar by using the straight edge 12c or a flat side edge 10e of the face plate 10. The elevational plan view of the face plate 10 in one piece can be taken to be similar to a cranium shape in cross-section of a human head vertically thereof as apparent in FIG. 1 of the drawings. The face plate 10 also is employable as a hand-tamping tool for soil or sand. The face plate 10 also serves with the handle 9 as a hand tiller for mulch and dry chemicals to be mixed as fertilizer or soil conditioner.

In a location opposite the flat side edge there can be seen a first step or notch 12f as well as a second step or gully 12g spaced from each other by a hump portion 12h which matches the "K" type gutter configuration in the cross section of a gutter or spouting installation of a building, house, garage or similar structure.

In summary, the multi-purpose hand tool has combinations of features employable world wide in scope and as a handyman's "side-kick" or "SIDE-KIK" tool having at least a dozen or more applications for employment thereof.

The reversible face plate 10 is employable not only by turning 180° for different types of gutter configurations but rather the face plate 10 is reversible also as to screw fastening thereof to the axial end 14 so that the half-round-curved edge or periphery 11p and the rectangular peripheral contour 12c can be reversed into mirror-image locations thereof for right or left handed users.

Optionally, a fourth part, namely, a metal sleeve, cap or cup-shaped member 19 can be fitted telescopically over the axial end 14 of the handle 9 so that the wood thereof is braced and kept from cracking, splitting, or breaking out during employment of the multi-purpose tool for more severe work force application therewith. Also an auxiliary side hole or aperture 20 for a guide or spacer to maintain transverse positioning in the gutter structure, can be located spaced inwardly along edge 10e.

The multi-purpose hand tool is adapted to lessen strain in performing many different chores and to add ease in better coping with some less enjoyable chores, whether around the home, the office or even a factory. The multi-purpose hand tool with only a minimum of parts is light weight, less than one (1) pound and handy to work with when compared to bulky long-handled tools. The size is ideal for older individuals, men, women and children to utilize, an ideal situation which also makes the tool, that is much smaller than other tools, easier to store in a minimum storage space. Durability of the handle made of a rod or dowel of wood as well as the sheet steel face plate is a plus factor for high quality workmanship and reliability. The easy-to-store size, easy-to-use form and easy-to-carry weight make this little tool very convenient and versatile to perfom a great deal of work quickly and effectively. This multi-purpose tool is a must for everyone, who is into growing plants around the home, the office or the factory, especially with upwardly spiraling costs due to inflation, for example, to facilitate having home-grown vegetables or flowers.

The present invention is, of course, in no way restricted to the specific disclosure of the specification and drawings but also encompasses any modifications within the scope of the appended claims.

What I claim is:

1. A multi-purpose tool for performance of at least a dozen or more tasks around a home, an office and the garden basically as (A) a gutter clean-out tool adapted to fit (a) narrow "K" type gutters; (b) wide "K" type gutters; (c) narrow half-round gutters; and (d) wide half-round gutters as well as also including most other common types of gutter cross-sectional configurations; (b) additional applications including (e) a weeder in a garden; (f) a ditcher; (g) a hoe; (h) a spreader; (i) a row-forming tool; (j) a seed-bed tool; (k) a furrowing tool; (l) a deep-planting tool for bulbs, sets (onion, for example), and small plants; (m) a blending tool for mortar and plaster; (n) a hand tiller for mulch and dry chemicals; (o) a hand tamping tool for soil and sand; (p) a planting lateral-spacing gauge tool; (q) a planting depth-gauge tool; and (r) a scraper, said multi-purpose tool in combination therewith comprising:

- a single face plate including a flat sheet metal body having a centrally located hole therethrough;
- a first portion of said metal body having a half-round-curved periphery in a configuration adapted to fit into half-round gutters;
- a second portion of said metal body having a more retangular peripheral contour conforming to inner shape of K-type gutters;
- a handle having an axial end that abuts centrally against said flat sheet metal body of said single face plate and having a free end remote therefrom as well as having measuring graduations on said handle in location intermediate said ends; and
- a fastening means inserted through the centrally located hole and into said axial end of said handle so that said free end as well as said measuring graduations and said face plate are available to fit (A) and for the additional applications (B).

2. A multi-purpose tool in combination according to claim 1, wherein a truncated, conically-tapered configuration of structure adjoins said free end of said handle.

3. A multi-purpose tool in combination according to claim 2, wherein said face plate is reversible into two opposite positions determined by axially rotating said handle 180°.

4. A multi-purpose tool in combination according to claim 3, wherein said face plate in a first position thereof fits transversely into half-round gutter configuration and is movable therein to clean out the half-round gutter to remove debris therefrom such as leaves, roof-shingle sand, tree seeds and blossoms.

5. A multi-purpose tool in combination according to claim 4, wherein said face plate in a second position thereof fits transversely into a more rectangular K-type gutter configuration to remove debris therefrom.

6. A multi-purpose tool in combination according to claim 5, wherein said handle is a wooden rod having said measuring graduations thereon as a lateral-spacing and depth gauge.

7. A multi-purpose tool in combination according to claim 6, wherein said wooden-rod handle has a pretapped hole axially in said axial end thereof wherein said fastening means enters.

8. A multi-purpose tool in combination according to claim 7, wherein said fastening means is a wood screw driven into the pretapped hole of said wooden-rod handle.

9. A multi-purpose tool in combination according to claim 8, wherein a metal sleeve telescopes axially over said axial end to reinforce and strengthen location of said wooden-rod handle radially outwardly from said wood screw fastening means therein.

10. A multi-purpose tool in combination according to claim 5, wherein first and second indentation steps are located along with a curved bulge configuration therebetween along one-side-edge periphery of said second portion of said face plate.

* * * * *